Nov. 3, 1931. E. F. NOELL ET AL 1,830,037
PRINTER'S REGISTERING DEVICE
Filed May 22, 1929 3 Sheets-Sheet 1
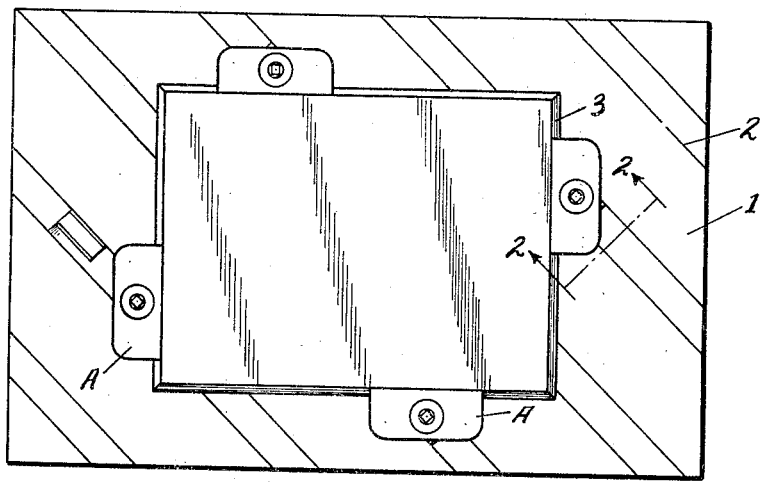
Fig. 1
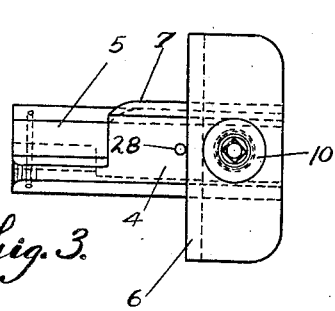
Fig. 3.
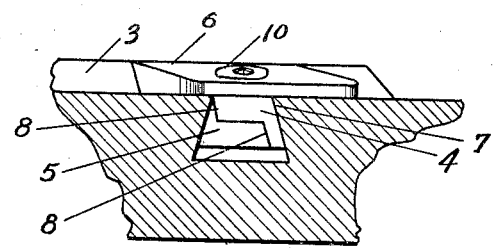
Fig. 2.
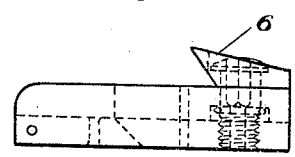
Fig. 4.
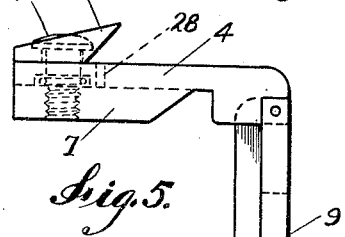
Fig. 5.
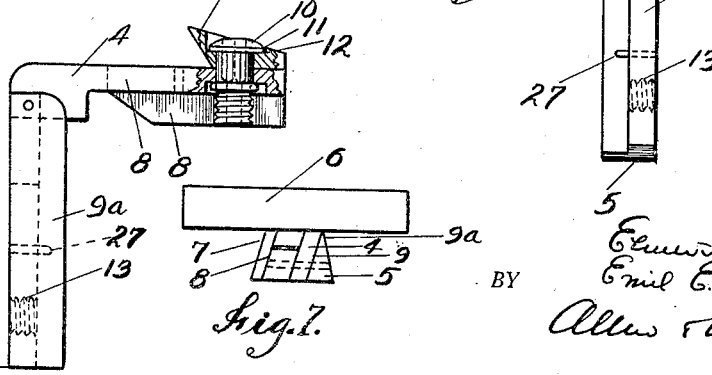
Fig. 6.
Fig. 7.
INVENTORS
BY
ATTORNEYS

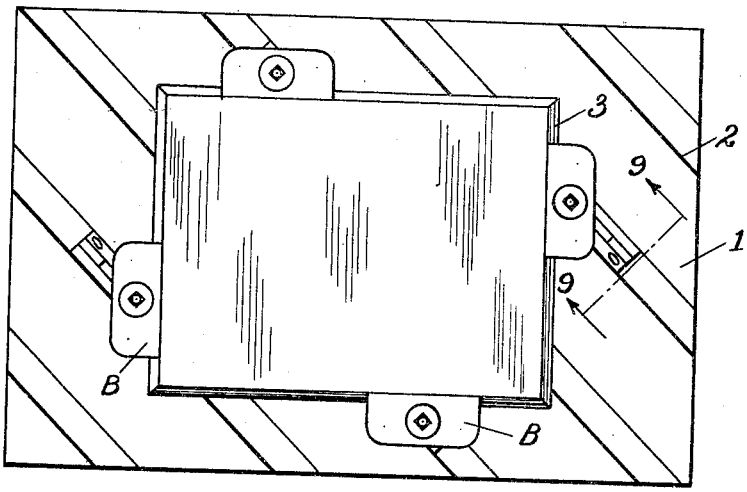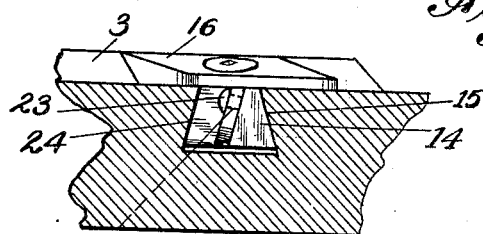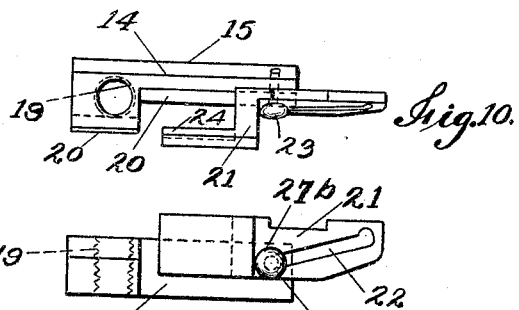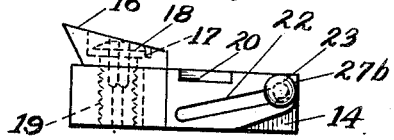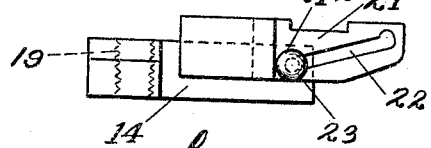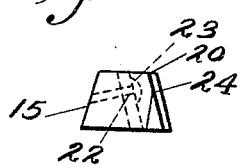

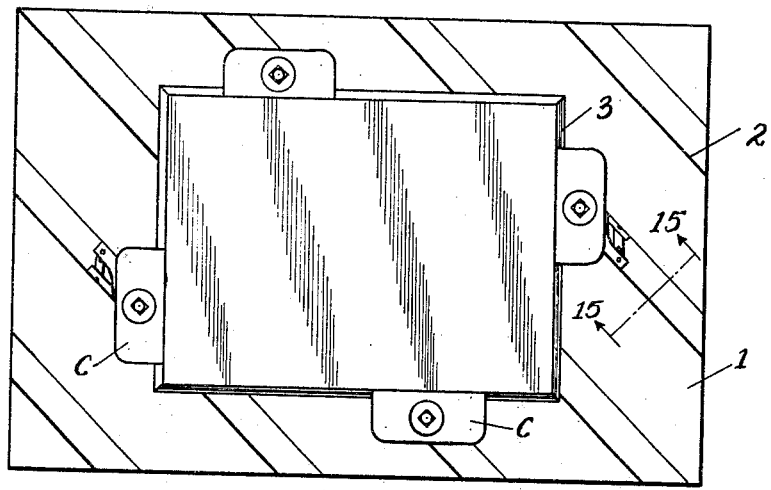
Fig. 14
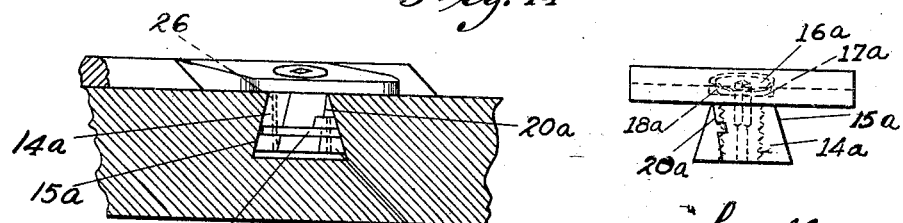
Fig. 15.  Fig. 16.
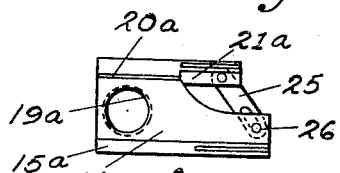 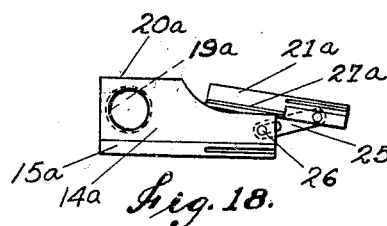
Fig. 17  Fig. 18.
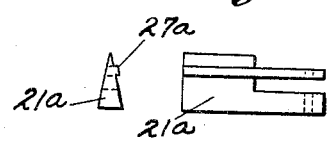 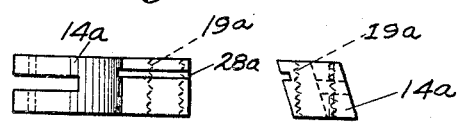 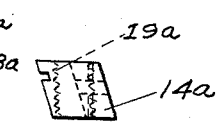
Fig. 19.  Fig. 20.  Fig. 21.  Fig. 22.

Patented Nov. 3, 1931

1,830,037

UNITED STATES PATENT OFFICE

ELMER F. NOELL AND EMIL E. THIEL, OF CINCINNATI, OHIO, ASSIGNORS TO THE PRINTING MACHINERY COMPANY, OF CINCINNATI, OHIO, A CORPORATION OF OHIO

PRINTER'S REGISTERING DEVICE

Application filed May 22, 1929. Serial No. 365,212.

Our invention relates to printers' registering devices for aligning and retaining printing plates on foundation plates having grooves therein which the bodies of the registering devices may be clamped.

The foundation plates for printing presses are usually in the form of rollers having grooves extending spirally therein, so that the registering devices must be adapted to be dropped in the grooves from above. The particular type of groove with which the devices disclosed herein are particularly adapted for use are ordinarily dovetailed with the narrowest openings in the grooves at the tops thereof.

In the application of Elmer F. Noell, Serial No. 351,049, filed March 29, there is described a printer's registering device in which a carrier member is provided having one side slanting in alignment with one side of the groove, and with pivoted blocks arranged to swing into the groove after the carrier body is inserted and wedged against the opposite wall of the groove. While this invention incorporates broadly the principle involved in the several modifications described herein there is one disadvantage which it is the object of our invention to improve. In the hereinbefore referred to application, the pivoted blocks do not extend beyond the position in which the adjustment screw is mounted, so that the lateral sides of the carrier body is not reinforced for its clamping engagement within the groove in the position in which there is the greatest strain when the adjustment screw is tightened down.

It is our object to provide a registering device in which groove filling wedges are adapted to be moved into clamping position to completely fill the groove at the sides of the adjustment screw, so that the device may be clamped entirely firmly and securely within the groove. Another object is to provide a clamping device having a carrier or body which extends only at one end within the groove, so that pairs of clamps may be moved into closely adjacent position.

The above and other specific objects which will be hereinafter described, we accomplish by that certain combination and arrangement of parts of which we have shown several preferred modifications.

Referring to the drawings:

Figure 1 is a plan view of a foundation plate and printing plate with four registering devices holding the plate in position.

Figure 2 is a sectional view of Figure 1 taken along the lines 2—2 of Figure 1.

Figure 3 is a plan view of the registering device shown in Figures 1 and 2 detached from the foundation plate.

Figure 4 is a side elevation of the device shown in Figure 3.

Figure 5 is a side elevation of the device shown in Figures 3 and 4 showing the clamping attachment swung down into position for insertion within a groove.

Figure 6 is a side elevation of the clamping device shown in Figure 5 taken from the side opposite that from which 5 is shown.

Figure 7 is a front elevation of the device shown in Figures 3 and 4.

Figure 8 is a plan view of a foundation plate similar to that shown in Figure 1 in which a modified type of registering device is employed.

Figure 9 is a sectional view of the assembly shown in Figure 8 taken along the lines 9—9.

Figure 10 is a plan view of the modified type of registering device shown in Figures 8 and 9 with the clamping jaw removed.

Figure 11 is a side elevation of the registering device shown in Figure 10 including the clamping jaw.

Figure 12 is a side elevation of the combination shown in Figures 10 and 11 with the clamping slider in extended position.

Figure 13 is a front elevation of the body of the device shown in Figures 10 to 12.

Figure 14 is a plan view of a foundation plate and printing plate with another modified type of clamp being used for securing the printing plate in position.

Figure 15 is a sectional view taken along the lines 15—15 in Figure 14.

Figure 16 is a front elevation of the modified type of clamp shown in Figures 14 and 15.

Figure 17 is a front elevation of the carrier of the device shown in Figure 16 with the clamping jaw and screw removed.

Figure 18 is a view similar to that shown in Figure 17 with the wedge block extended.

Figure 19 is an end elevation of the wedge clamping member of the combination shown in Figures 14 to 18.

Figure 20 is a plan view of the element shown in Figure 19.

Figure 21 is a plan view of the carrier body of the combination shown in Figures 14 to 18.

Figure 22 is an end elevation of the carrier body shown in Figure 21.

Referring first to the general assembly views shown in Figures 1, 8 and 14, we have shown the foundation plate 1 having diagonally extending grooves 2, within which the registering devices are dropped and moved into engagement with the slanting edges 3 of the printing plates and there tightened to hold the printing plates in position.

We shall refer to the registering device shown in Figures 1 to 7 as modification A, to the device shown in Figures 8 to 13 as modification B, and to the device shown in Figures 14 to 22 as modification C.

Modification A is composed of a pair of pivoted wedge members 4 and 5, the member 4 carrying the clamping hook 6 and having one side 7, which is beveled to lie against one of the slanting walls of the groove in the foundation plate. The other side 8 of the block 4 is slanted parallel with the side 7 of the member 4. The block 5 has one face 9, which is aligned with the face 8 of the block 4, and the other 9a is slanted so that when the carrier body is inserted within the groove the face 9a will bear against the side of the groove opposite to that engaged by the side 7. The screw 10 has a shoulder 11 which abuts an annular shoulder 12 in the clamping hook 6. Threads are provided in an aperture 13 in the block 5, so that when the screw is turned down, it pulls up against the wedge formed by the blocks 4 and 5 and causes them to bind against the walls of the groove thereby clamping the hook in position.

Referring now to modification B we have a carrier member 14, having a face 15, having a similar angle of inclination as one side of the groove. The clamping hook 16 is provided with an annular shoulder 17, against which a shoulder 18 on the adjusting screw 18 seats. The screw is threaded through a threaded aperture 19 in the carrier element 14. The face 20 of the carrier opposite the face 15 is inclined parallel with the opposite wall of the groove, and a slider 21 having a slot 22 therein is secured by a pin 23 to the carrier. After the carrier is inserted within the groove the slider 21, which has a face 24 parallel with the opposite wall of the groove, may be moved into position bearing against the face 20. The adjustment of the screw pulls upwardly on the faces 15 and 24 which bear against the walls of the groove, and the registering device is thus clamped in position with its clamping face bearing against the side of the printing plate.

Modification C is quite similar to modification B, excepting in this instance, the wedging element is pivoted to a hinged arm. There is a carrier member 14a having a face 15a, having a similar angle of inclination at one side of the groove. The clamping hook 16a is provided with an annular shoulder 17a, against which a shoulder 18a seats. The screw is threaded through a threaded aperture 19a in the carrier element 14a. The face 20a of the carrier opposite the face 15a is inclined parallel with the face 15a. The slider 21a is pivoted to a link 25, which is in turn pivoted to the carrier as indicated at 26. When the carrier is inserted in the groove, the slider 21a is moved up to such a position that it bears against the wall of the groove opposite that which is engaged by the face 15a, and when the adjustment screw is turned the carrier and slider are wedged against the walls of the groove. Modification A has a pin 27 which registers with an aperture 28 in one of the carrier members to insure proper registry. Modification C has a rib 27a which registers with a groove 28a in the carrier. The pin 23 has an enlarged head 27b, which in this modification secures proper registry of the component parts of the carrier.

It will thus be observed that all the modifications have in common the combination of one element of the carrier, which has a face which is aligned with one slanting wall of the groove, and another element adjustable relative to this face which has a face which is movable into such position as to flank the sides of the assembly opposite the adjustment screw. Further, all the modifications have the screw mounting for the clamp at one end of the carrier, so that two registering devices may be brought into close contact with the ends of the clamping faces practically abutting. Further, all the modifications are provided with means for insuring proper registry of the component parts of the carrier when the parts are in position to be clamped in position with the clamping jaw bearing against an edge of a printing plate.

All the modifications are inserted in the groove of a foundation in a substantially similar manner, that is, the screw is released and one part of the carrier inserted in the groove. The other part of the assembly is then pressed into position and the device is ready for setting. While we have only shown several modifications of our invention mechanical variations in the particular arrangements described will readily occur to those skilled in the art, but in so far as such variations incorporate the principles involved in the modifications disclosed, we consider them within the scope of our invention.

Having thus described our invention, what we claim as new and desire to secure by Letters Patent, is:—

1. A registry clamp for use in combination with a foundation plate, having dovetail grooves which are wider at the bottom than at the top, comprising a clamp and a carrier for the clamp, said carrier having portions pivotally connected together, one of said portions having a face aligned with one wall of a groove and the other having a face aligned with the opposite wall of the groove, said portions constructed and arranged to be movable into clamping engagement within said groove, and said clamp being pivotally mounted at one end of said carrier.

2. A registry clamp for use in combination with a foundation plate, having dovetail grooves which are wider at the bottom than at the top, comprising a clamp and a carrier for the clamp, said carrier having portions pivotally connected together, one of said portions having a face aligned with one wall of a groove and the other having a face aligned with the opposite wall of the groove, said portions constructed and arranged to be movable into clamping engagement within said groove, and said clamp being pivotally mounted at one end of said carrier, the aligned faces of said portions extending adjacent to the end of said carrier in which said clamp is pivotally mounted.

3. A printer's registering device comprising a carrier having a clamp pivotally mounted at one end of said carrier, said carrier composed of cooperating elements, one constructed and arranged to abut one wall of a dovetail groove in a foundation plate, and the other to abut the other, said cooperating elements overlapping at the sides of the carrier adjacent the pivotal mounting of said clamp.

4. A printer's registering device comprising a carrier having a clamp pivotally mounted at one end of said carrier, said carrier composed of cooperating elements, one constructed and arranged to abut one wall of a dovetail groove in a foundation plate, and the other to abut the other, said cooperating elements overlapping at the sides of the carrier adjacent the pivotal mounting of said clamp, and means for insuring proper registry of said cooperating elements.

5. A registering device for use with a foundation support having grooves with depending side walls, said device comprising a composite carrier base with a clamping member pivotally mounted at one end of the carrier, and said composite base having one member adapted to bear against one wall of a groove, and another member adapted to bear against the other, said members being pivotally connected together.

6. A registering device for use with a foundation support having grooves with depending side walls, said device comprising a composite carrier base with a clamping member pivotally mounted at one end of the carrier, and said composite base having one member adapted to bear against one wall of a groove, and another member adapted to bear against the other, said members being pivotally connected together, and being of such length as to extend to a position reinforcing the clamping action of said clamping member.

7. A registering device for use with a foundation support having grooves with depending side walls, said device comprising a composite carrier base with a clamping member pivotally mounted at one end of the carrier, and said composite base having one member adapted to bear against one wall of a groove, and another member adapted to bear against the other, said members being pivotally connected together, and being of such length as to extend to a position reinforcing the clamping action of said clamping member, and means for insuring proper registry of said members.

8. A printer's registering device comprising a composite carrier having one member having a side slanting in alignment with one wall of a foundation support groove, and another member movably connected with said first noted member having a complementary wall slanting in alignment with the opposite wall of said groove, said members adapted to be extended into alignment at one end of the carrier, and a printing plate clamping member pivotally mounted in one of said members at the end in which said members are in alignment.

9. A printer's registering device comprising a composite carrier having one member having a side slanting in alignment with one wall of a foundation support groove, and another member movably connected with said first noted member having a complementary wall slanting in alignment with the opposite wall of said groove, said members adapted to be extended into alignment at one end of the carrier, and a printing plate clamping member pivotally mounted in one of said members at the end in which said members are in alignment, said members having aligning elements to insure proper registry thereof within a foundation support groove.

10. In combination with a printing plate clamping element, members cooperatively connected together, one of said members adapted to seat against one wall of a groove in a foundation support, and the other adapted to be moved into registry with said member and to bear against the opposite wall of said groove, said clamping element pivotally mounted in at least one of said members in such a position that when said members are moved into registry the pivot for said clamping element will lie between registering portions of said members.

11. In combination with a printing plate clamping element, members cooperatively connected together, one of said members adapted to seat against one wall of a groove in a foundation support, and the other adapted to be moved into registry with said member and to bear against the opposite wall of said groove, said clamping element pivotally mounted in at least one of said members in such a position that when said members are moved into registry the pivot for said clamping element will lie between registering portions of said members, and means for aligning said members in registry.

ELMER F. NOELL.
EMIL E. THIEL.